(12) United States Patent
Ku

(10) Patent No.: US 8,370,213 B2
(45) Date of Patent: Feb. 5, 2013

(54) ELECTRONIC COMMERCE SYSTEM FOR PROCESSING AUXILIARY ORDER FORM ON ON-LINE OPEN MARKET AND METHOD THEREOF

(75) Inventor: Young Bae Ku, Seoul (KR)

(73) Assignee: eBay Korea Co., Ltd., Seoul (KR)

( * ) Notice: Subject to any disclaimer, the term of this patent is extended or adjusted under 35 U.S.C. 154(b) by 330 days.

(21) Appl. No.: 12/747,350

(22) PCT Filed: Dec. 1, 2008

(86) PCT No.: PCT/KR2008/007078
§ 371 (c)(1),
(2), (4) Date: Jun. 10, 2010

(87) PCT Pub. No.: WO2009/075483
PCT Pub. Date: Jun. 18, 2009

(65) Prior Publication Data
US 2010/0262516 A1    Oct. 14, 2010

(30) Foreign Application Priority Data
Dec. 11, 2007  (KR) .................. 10-2007-0128031

(51) Int. Cl.
*G06Q 30/00* (2012.01)
(52) U.S. Cl. ............ 705/26.41; 705/26.1; 705/317
(58) Field of Classification Search .......... 705/26.1, 705/26.41, 26.42, 26.43, 26.44, 317, 318
See application file for complete search history.

(56) References Cited

U.S. PATENT DOCUMENTS

| 2004/0138897 | A1 * | 7/2004 | Eapen ........................... 705/1 |
| 2006/0206412 | A1 * | 9/2006 | Van Luchene et al. ........ 705/37 |
| 2007/0282738 | A1 * | 12/2007 | Highbloom .................... 705/38 |
| 2008/0091663 | A1 * | 4/2008 | Inala et al. ...................... 707/3 |
| 2008/0167883 | A1 * | 7/2008 | Thavildar Khazaneh ...... 705/1 |
| 2009/0030910 | A1 * | 1/2009 | Bennett et al. ................ 707/10 |
| 2010/0325555 | A1 * | 12/2010 | Rangarajan et al. .......... 715/739 |

FOREIGN PATENT DOCUMENTS

| JP | 2004152104 A | * | 5/2004 |
| KR | 20000036755 A |   | 7/2000 |
| KR | 20010104504 A |   | 11/2001 |
| KR | 20010114118 A |   | 12/2001 |
| KR | 2002095488 A | * | 12/2002 |
| KR | 2003045255 A | * | 6/2003 |
| KR | 1020050013517 A |   | 2/2005 |
| KR | 1020050071382 A |   | 7/2005 |
| KR | 1020070101706 A |   | 10/2007 |

OTHER PUBLICATIONS

Kersnar, S., "Fidelity National Unveils Technology Partnerships to Provide Broker Services," National Mortgage News, vol. 24, No. 43, p. 14, Jul. 17, 2000.*

* cited by examiner

*Primary Examiner* — Nicholas D Rosen
(74) *Attorney, Agent, or Firm* — The Webb Law Firm

(57) ABSTRACT

An electronic commerce system and method for processing auxiliary order information in an on-line open market are provided. The system includes an on-line market server for brokering the on-line transaction on the Internet, wherein the on-line market server, when entrusted with partial or full processing of acquisition of auxiliary order documents for an object for sale requested for purchase from the buyer, acquires the auxiliary order documents from an issuing authority and requests the seller to deliver the object for sale, based on the auxiliary order documents; and at least one database for storing information related to the buyer and the seller.

9 Claims, 6 Drawing Sheets

Fig. 5

| RELATIONSHIP WITH CAR OWNER | |
|---|---|

| CAR OWNER | NAME | | VERIFY REAL NAME |
|---|---|---|---|
| | RESIDENCE REGISTRATION NUMBER | | |

| CAR NUMBER | |
|---|---|

| PARKING PLACE | |
|---|---|

I ENTRUST THE ACQUISITION OF A CAR REGISTRATION CERTIFICATE BASED ON THE ABOVE CONTENT.

ELECTRONIC COMMERCE SYSTEM FOR PROCESSING AUXILIARY ORDER FORM ON ON-LINE OPEN MARKET AND METHOD THEREOF

TECHNICAL FIELD

The present invention relates to an on-line open market, and more particularly, to an electronic commerce system and method for processing auxiliary order information in an on-line open market whereby a difficulty in a purchase process can be overcome by entrusting partial or full processing of acquisition of auxiliary order documents for goods or services from a buyer and ordering the goods or services using issued auxiliary order documents, and of promoting sales of the goods or services requiring the auxiliary order documents by inducing on-line purchase of goods or services.

BACKGROUND ART

In recent years, the growth of an on-line open market has been prominent. An on-line open market refers to a three-dimensional shopping mall that provides an on-line shopping space for a direct transaction between sellers and buyers on the Internet. The on-line market takes only a commission for a transaction space to minimize a marketing margin for a lower consumer price, unlike conventional on-line shopping malls covering all transaction activities including marketing, registration, order, and delivery related to goods.

In general, in an on-line open market providing brokerage so that buyers can purchase a variety of goods or services registered by sellers, the buyer can receive desired goods or services from the seller by inputting simple basic order information such as a number, a color, a size of the goods or services and paying a price of the goods or services.

As such on-line transactions become more common, goods or services for sale are increasing. In particular, buyers may purchase goods or services by inputting simple basic order information. However, there are goods or services that require auxiliary order documents issued by an issuing authority, such as an identity card copy or a car registration certificate copy, in addition to basic order information. In this case, a buyer must acquire an auxiliary order document from an issuing authority via an off-line means, such as facsimile or postal delivery, each time the buyer purchases goods or services.

Accordingly, there is a need for a buyer-friendly scheme enabling an on-line open market to properly process basic order information and auxiliary order documents input by a buyer without requiring separate information exchange between the buyer and a seller via an off-line means, for goods or services requiring auxiliary order documents in addition to basic order information.

DISCLOSURE OF INVENTION

Technical Problem

The present invention is directed to an electronic commerce system and method for processing auxiliary order information in an on-line open market whereby a difficulty in a purchase process can be overcome by entrusting partial or full processing of acquisition of auxiliary order documents and ordering goods or services using issued auxiliary order documents, instead of requiring a buyer to directly input the auxiliary order information for every purchase.

The present invention is also directed to an electronic commerce system and method for processing auxiliary order information in an on-line open market whereby sales of goods or service requiring both basic order information and separate auxiliary order information can be promoted by enabling on-line purchase through overcoming a difficulty in purchasing goods or services.

Technical Solution

According to an exemplary embodiment of the present invention, an electronic commerce system for brokering an on-line transaction between a seller and a buyer includes: an on-line market server for brokering the on-line transaction on the Internet, wherein the on-line market server, when entrusted with partial or full processing of acquisition of auxiliary order documents for an object for sale requested for purchase from the buyer, acquires the auxiliary order documents from an issuing authority and requests the seller to deliver the object for sale, based on the auxiliary order documents; and at least one database for storing information related to the buyer and the seller.

The on-line market server may include: a transaction broker for brokering the on-line transaction on the Internet; an issuance processor for, when receiving auxiliary order information for entrusting partial or full processing of acquisition of the auxiliary order documents for an object for sale for which basic order information is input from the buyer performing the on-line transaction, an issuance processor requesting the issuing authority to provide the auxiliary order documents and acquiring the auxiliary order documents; and a controller for requesting the seller to deliver the object for sale, based on the basic order information and the auxiliary order documents.

The on-line market server may further include a real name verifier for verifying a real name of the buyer by verifying whether the buyer has subscribed to the on-line open market, instead of acquiring an auxiliary order document for verifying identity of the buyer when receiving the auxiliary order information for entrusting partial or full processing of acquisition of the auxiliary order documents for the object for sale for which basic order information is input from the buyer.

When the buyer is a representative for a real buyer and the real name verifier receives the auxiliary order information for entrusting partial or full processing of acquisition of the auxiliary order documents from the attorney, the real name verifier may verify the real name of the real buyer based on the auxiliary order information instead of acquiring an auxiliary order document for verifying identity of the buyer, and provide the verification result to the issuance processor.

When the auxiliary order information for entrusting partial or full processing of acquisition of the auxiliary order documents for an object for sale for which basic order information is input from the buyer is received, the issuance processor may request the issuing authority to provide an auxiliary order document corresponding to a credit class of the seller that sells the object for sale and acquire the auxiliary order document.

In this case, the issuing authority may include an authority for issuing a pre-determined certificate corresponding to the auxiliary order document or a server managed by the authority. The auxiliary order document may include at least one of an identity card copy for verifying identity of the buyer and a car registration certificate copy for verifying whether the buyer owns a car.

According to another exemplary embodiment of the present invention, an electronic commerce system for brokering an on-line transaction between a seller and a buyer includes: a real name verifier for verifying a real name of the buyer by verifying whether the buyer has subscribed as a member, instead of acquiring an identity card copy when entrusted with partial or full processing of acquisition of auxiliary order documents for an object for sale for which basic order information is input from the buyer; an issuance processor for requesting an issuing authority to provide a car registration certificate copy among the auxiliary order documents and acquiring the car registration certificate copy; and a controller for requesting the seller to deliver the object for sale, based on the basic order information for the object for sale, the real name verifying result, and the car registration certificate copy.

In this case, the issuing authority may include an authority for issuing a pre-determined certificate corresponding to the auxiliary order document or a server managed by the authority. The object for sale may include a Hi-pass terminal.

According to still another exemplary embodiment of the present invention, an electronic commerce method for brokering an on-line transaction between a seller and a buyer includes: verifying, by an on-line market server, whether the on-line market server receives auxiliary order information for entrusting partial or full processing of acquisition of auxiliary order documents for an object for sale for which basic order information is input from the buyer; acquiring, by the on-line market server, the auxiliary order documents from an issuing authority depending on the verification result; and requesting, by the on-line market server, the seller to deliver the object for sale, based on the basic order information and the auxiliary order documents.

Verifying may include: when a request for purchase of the object for sale for which the basic order information is input is received from the buyer, requesting, by the on-line market server, the auxiliary order information for the object for sale; and determining, by the on-line market server, whether the auxiliary order information is received from the buyer.

Acquiring may include: when the on-line market server receives the auxiliary order information, searching for an issuing authority for issuing the auxiliary order documents; requesting, by the on-line market server, the issuing authority to issue the auxiliary order documents; and acquiring, by the on-line market server, the auxiliary order documents from the issuing authority.

Acquiring may include: verifying, by the on-line market server, whether the buyer is a real buyer based on the auxiliary order information when receiving the auxiliary order information; and verifying, by the on-line market server, a real name of the buyer by verifying whether the buyer has subscribed to the on-line open market, instead of acquiring an auxiliary order document for buyer identity verification when the buyer is a real buyer.

Acquiring may include: verifying, by the on-line market server, whether the buyer is a real buyer based on the auxiliary order information when receiving the auxiliary order information; and verifying, by the on-line market server, a real name of the real buyer, instead of acquiring an auxiliary order document for buyer identity verification when the buyer is not a real buyer.

Acquiring may include: acquiring, by the on-line market server, the auxiliary order document corresponding to a credit class of the seller from the issuing authority when receiving the auxiliary order information.

Requesting may include: causing, by the on-line market server, the seller to confirm an order content, based on the basic order information and the auxiliary order documents for the object for sale; verifying, by the on-line market server, whether the seller confirming the order content requests to modify the order content; and requesting, by the on-line market server, the seller to deliver the object for sale when the seller does not request to modify the order content.

In this case, the issuing authority may include an authority for issuing a pre-determined certificate corresponding to the auxiliary order document or a server managed by the authority, and the auxiliary order document may include at least one of an identity card copy for verifying the identity of the buyer and a car registration certificate copy for verifying whether the buyer owns a car.

According to yet another exemplary embodiment of the present invention, an electronic commerce method for brokering an on-line transaction between a seller and a buyer includes: when entrusted with partial or full processing of acquisition of auxiliary order documents for an object for sale for which basic order information is input from the buyer, verifying a real name of the buyer by verifying whether the buyer has subscribed as a member, instead of acquiring an identity card copy among the auxiliary order documents; requesting an issuing authority to provide a car registration certificate copy among the auxiliary order documents and acquiring the car registration certificate copy; and requesting the seller to deliver the object for sale, based on the basic order information for the object for sale, the real name verification result and the car registration certificate copy.

In this case, the issuing authority may include an authority for issuing a pre-determined certificate corresponding to the auxiliary order document or a server managed by the authority. The object for sale may include a Hi-pass terminal.

The above and other objects and features of the invention will become more apparent from the following detailed description with reference to the accompanying drawings.

Advantageous Effects

According to the present invention, a difficulty in a purchase process is overcome by entrusting partial or full processing of acquisition of auxiliary order documents and ordering the goods or services using issued auxiliary order documents, instead of a buyer directly inputting auxiliary order information for every purchase.

Furthermore, sales of goods or services requiring both basic order information and separate auxiliary order information can be promoted by enabling on-line purchase through overcoming of a difficulty in purchasing goods or services.

BRIEF DESCRIPTION OF DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 5 illustrates an auxiliary order form according to an exemplary embodiment of the present invention.

MODE FOR THE INVENTION

Hereinafter, an electronic commerce system and method for processing auxiliary order information in an on-line open market according to an exemplary embodiment of the present invention will be described with reference to FIGS. 1 to. 6.

The present invention proposes a scheme for simplifying a process of purchasing objects for sale, goods, or services that require auxiliary order documents, such as an identity card copy or a car registration certificate copy that is issued by an issuing authority. In other words, in the present invention, partial or full processing of acquisition of auxiliary order documents is entrusted to an on-line open market. For example, the on-line open market may verify whether a buyer has subscribed to the on-line open market, instead of acquiring an identity card copy for verifying an identity of the buyer or may be entrusted with acquisition of a car registration certificate copy required for registration of objects for sale from an issuing authority to thereby sell the objects for sale.

According to the present invention, an on-line process of purchasing objects can be further simplified and the on-line transaction of objects having a complex purchase process can become more common.

Figure 1:
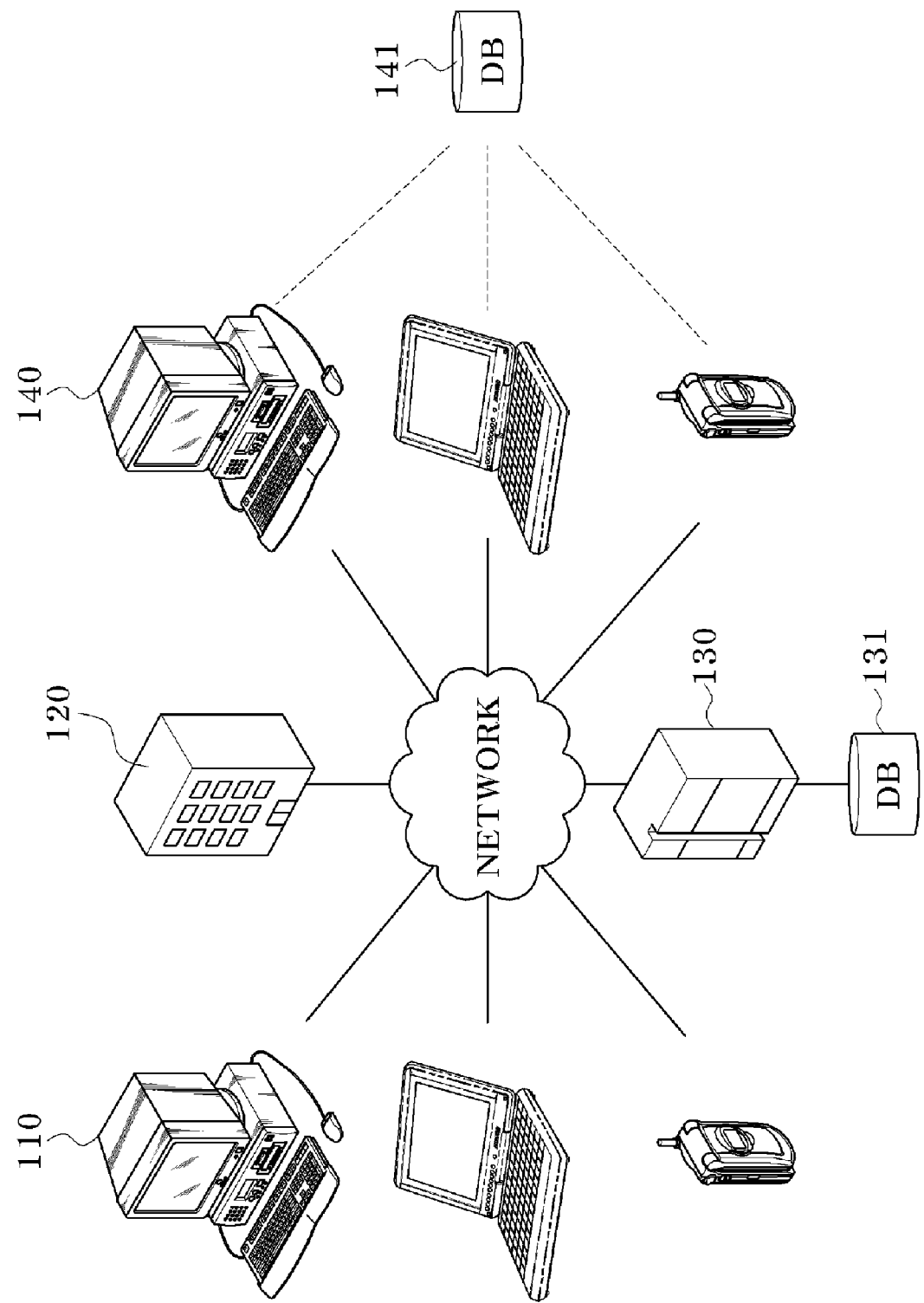
FIG. 1 illustrates a configuration of an on-line market system for electronic commerce according to an exemplary embodiment of the present invention.

FIG. 1 illustrates a configuration of an on-line market system for electronic commerce according to an exemplary embodiment of the present invention.

Referring to FIG. 1, an on-line market system according to an exemplary embodiment of the present invention may include a buyer terminal 110, an issuing authority 120, an on-line market server 130, a first database 131, a seller terminal 140, and a second database 141.

The on-line market server 130 may perform a payment process for an object for sale selected by the buyer from a list of objects for sale, goods or services, perform an object delivery process including notifying the seller of payment information so that the object for sale can be delivered to the buyer, and provide position tracking or result inquiry service.

In this case, the goods or services for sale may include goods or services having general brands; and goods such as domestic handiworks, returned discounted goods, second-hand goods, cooperatively purchased goods and services including mental or physical works, such as interior construction, construction, building, and legal services for which an on-line transaction are difficult due to characteristics of markets and goods or restrictions of related laws. In addition, the goods or services in the present invention may include all goods or services requiring auxiliary order documents such as an identity card copy, a car registration certificate copy, as well as general basic order information.

The on-line market server 130 may interwork with a separate issuing authority 120 in order to sell goods or services requiring auxiliary order information, such as an identity card copy or a car registration certificate copy. The issuing authority 120 includes an authority for issuing a certificate or a server managed by the authority including authorities such as, for example, a village office or a resident center for issuing a resident registration copy, a vehicle registration office for issuing a car registration certificate, or servers managed by such authorities.

In this case, the first database 131 interworking with the on-line market server 130 may store buyer information, seller information, basic order information, or a form for entrustment with acquisition of auxiliary order documents, which may be alternatively stored in separate databases.

In general, the buyer terminal 110 and the seller terminal 140 may be personal computers (PCs), notebook computers, or Personal Digital Assistants (PDAs), but are not necessarily limited thereto. The buyer terminal 110 and the seller terminal 140 may be any of other wired or wireless communication devices that may access the on-line market server over a network and use bi-directional electronic commerce service.

In this case, the second database 141 interworking with the seller terminal 140 may store information related to the goods or services, as well as the form for entrustment of acquisition of the auxiliary order documents.

The network may be a wired or wireless network, or may be a core network integrated with a wired public network, a wireless mobile communication network, or portable Internet, e.g., Wireless internet Platform for interoperability (WiPi) or Wireless Broadband internet (WiBro). The on-line market server 130, which manages the on-line shopping mall over the network and brokers general transactions, auctions, reverse auctions, and bargains of goods or services between sellers and buyers, registers a variety of goods or services of the seller from the seller terminal 140 over the network and provides the registered goods or services to the buyer terminal 110 over the network so that the buyer can purchase desired ones of the goods or services.

In the present invention, upon receipt of a request for purchase of objects for sale, goods or services requiring the auxiliary order documents, such as an identity card copy or a car registration certificate copy, issued by the issuing authority, the on-line market server 130 may be entrusted by the buyer with partial or full processing of acquisition of the auxiliary order documents and perform the processing. In other words, by the buyer providing only information for issuance of the certificate necessary for purchase of an object for sale, the on-line market server 130 can obtain all auxiliary order documents which must be submitted to the seller to purchase the object for sale by requesting the issuing authority to provide the certificate on-line based on the information and acquiring the certificate.

According to the present invention, it is possible to verify whether the buyer has subscribed as a member, instead of acquiring documents for buyer identity verification, such as a buyer residence certificate copy, a driver s license copy, or a resident registration copy. This process can simplify a troublesome purchase process in which the buyer and the on-line market server must acquire the documents.

Figure 2:
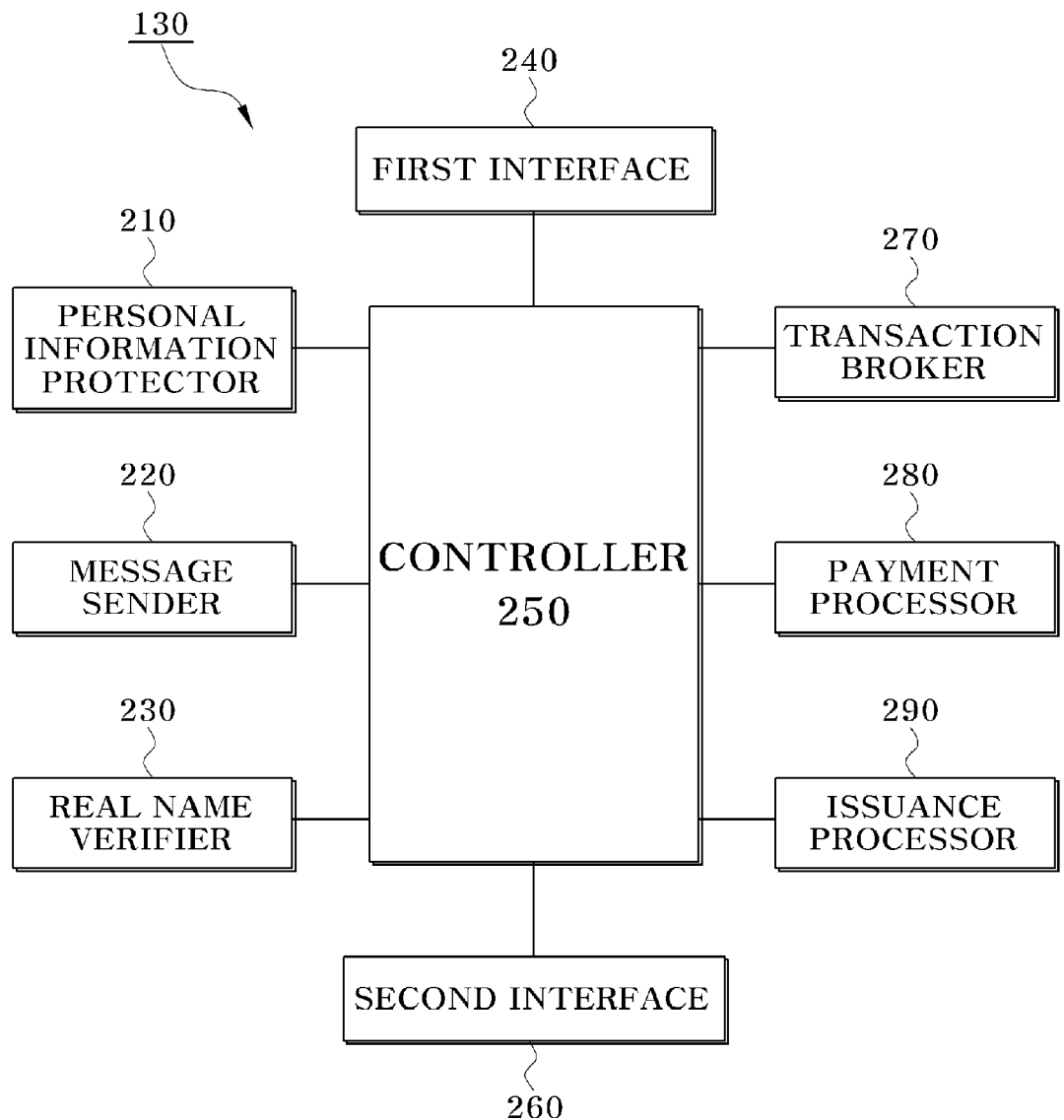
FIG. 2 is a block diagram of an on-line market server 130 in FIG. 1.

FIG. 2 is a block diagram of the on-line market server 130 in FIG. 1.

Referring to FIG. 2, the on-line market server 130 according to an exemplary embodiment of the present invention may include a personal information protector 210, a message sender 220, a real name verifier 230, a first interface 240, a controller 250, a second interface 260, a transaction broker 270, payment processor 280, and an issuance processor 290.

The on-line market server 130 may interwork with the buyer terminal, the issuing authority, and the seller terminal via the first interface 240.

The transaction broker 270 may provide information on goods or services stored in the first database to the buyer terminal via a webpage in order to broker an on-line transaction of goods or services registered by the seller, search for the goods or services based on a key word from the buyer terminal based on name or content, and provide a list of the objects and related information to the buyer terminal via a webpage.

The transaction broker 270 may provide an order page when the buyer selects desired goods or services, such that the buyer can check option field items, such as a field for selection and writing of the number of objects for sale depending on types of the objects for sale, a field for selection or text entry of a color, a field for selection or text entry of a size, and a field for selection or text entry of additional goods in a bundle, and may, for example, immediately purchase the objects for sale.

The transaction broker 270 may also request the buyer to input the auxiliary order information, if necessary, as well as the basic order information. For example, the transaction broker 270 may enable the buyer to upload auxiliary order documents, such as, a residence certificate copy, a driver s license copy, or a resident registration copy, as separate files on an order page, or may provide a predetermined tag for inputting entrustment information for acquisition of the auxiliary order documents, so that the buyer can select the tag.

Thus, the present invention provides a scheme for entrusting the on-line open market with acquisition of auxiliary order documents, such that the buyer can conveniently use the electronic commerce service and be led to perform the on-line purchase for goods or services requiring the auxiliary order documents.

The controller 250 basically controls, for example, goods registration by sellers and goods purchase by buyers, and delivery of goods in order to provide electronic commerce service for brokering on-line transactions for goods or services between the sellers and the buyers, and controls the above components of the on-line market server. Also, the controller 250 controls the objects for sale from the seller to be provided to the buyer after all the auxiliary order documents, for which the acquisition is entrusted in addition to the basic order information, are acquired.

For this, according to the present invention, the controller 250 acquires the auxiliary order documents using the issuance processor 290 and the real name verifier 230. The issuance processor 290 acquires the entrusted auxiliary order document from the issuing authority when entrusted with partial or full processing of acquisition of the auxiliary order documents, and the real name verifier 230 may verify whether the buyer has subscribed to the on-line open market, instead of acquiring the identity card copy of the auxiliary order documents.

Specifically, when the issuance processor 290 is entrusted by the buyer with partial or full processing of acquisition of the auxiliary order documents, the issuance processor 290 may search for an issuing authority for issuing the auxiliary order documents, request the searched issuing authority to issue the auxiliary order documents, and acquire the same. For example, when the auxiliary order document for the object for sale is a car registration certificate copy and the issuance processor 290 is entrusted with acquisition of the copy, the issuance processor 290 searches for a vehicle registration office for issuing the car registration certificate copy and provides the vehicle registration office with the buyer information, that is, a car owner, a car number, a parking place, and the like to acquire the copy.

The real name verifier 230, when entrusted by the buyer with partial or full processing of acquisition of the auxiliary order documents for the object for sale, may verify whether the buyer has subscribed to the on-line open market, instead of acquiring the submitted auxiliary order documents.

When the basic order information and the information on entrustment for acquisition of the auxiliary order documents contained in the order content are insufficient, the seller may request the buyer to modify the information on a screen of the seller terminal for transaction content confirmation. In this case, the message sender 220 may notify the buyer of the request through a message, such as a Short Message Service (SMS) message, a Long Message Service (LMS) message, or a Multimedia Message Service (MMS) message, or an e-mail. When the buyer requests to modify the order content for the object for sale, the message sender 220 may notify the request to the seller via a message or an e-mail.

When the basic order information and the information on entrustment for acquisition of auxiliary order documents, if necessary, are submitted and then the buyer selects ultimate payment execution for the goods or services, the transaction broker may provide payment screen information for the object for sale selected for payment by the buyer to the buyer terminal via a webpage. The buyer may select or input buyer-related information, payment object information, payment amount, delivery region, payment method, and the like on a payment screen displayed on the buyer terminal, based on the payment screen information. When all necessary information is input on the payment screen, the payment processor 280 may perform certificate-based authentication and the payment in response to the ultimate payment request from the buyer.

When a return or refund is not requested by the buyer who has received the purchased goods or services, ultimate purchase decision may be received from the buyer terminal, a cost may be settled according to a predetermined commission policy and the amount may be sent to an account of the seller.

When the seller requests to check information on entrustment for acquisition of an auxiliary order document in the order content for the object for sale, the personal information protector 210 causes personal information to be provided to the seller only within a predetermined period, for example, for one week after submitting the information according to a predetermined personal information protection policy in order to protect the personal information. When the seller requests to modify the entrustment information for acquisition of the auxiliary order document and the modification is against the protection policy, the personal information protector 210 may be notified by the buyer of violation of the seller and send it to an operator.

The on-line market server 130 may interwork with the first database 131 via the second interface 260.

Thus, according to the present invention, partial or full processing of acquisition of auxiliary order documents for goods or services can be entrusted to the on-line open market. In an exemplary embodiment, a process of purchasing a Hi-pass terminal that is mounted in a car and enabling a user to rapidly and safely pay a toll while driving a car without stopping through a wireless communication with an antenna installed in a tollgate structure will be described with reference to FIGS. 3 to 6. The identity card copy and the car registration certificate copy are required as auxiliary order documents to sell the Hi-pass terminal.

In this case, the Hi-pass terminal may be purchased 1) when a buyer desires to mount the Hi-pass terminal in his/her car, and 2) when the buyer desires to purchase the Hi-pass terminal in behalf of a real car owner.

The auxiliary order documents may include at least one of an identity card copy for verifying identity of a buyer, a car registration certificate copy for verifying whether the buyer owns a car, and a power of attorney for verifying purchase entrustment from a real buyer.

Figure 3:
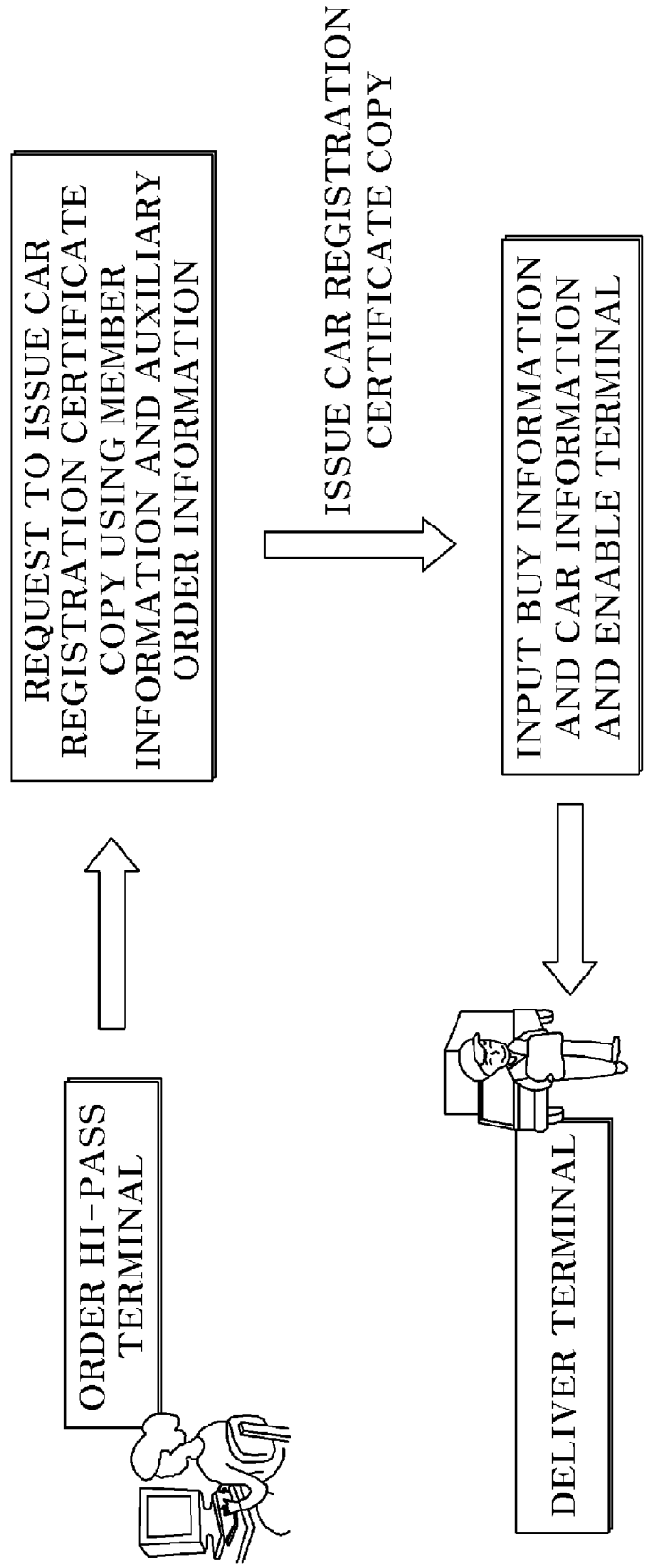
FIG. 3 illustrates a process of purchasing a Hi-pass terminal according to an exemplary embodiment of the present invention.

FIG. 3 illustrates a process of purchasing a Hi-pass terminal according to an exemplary embodiment of the present invention.

Referring to FIG. 3, to purchase a Hi-pass terminal for a car, the buyer accesses the on-line market server managed by the on-line open market using the buyer terminal and inputs basic order information, and information on entrustment for acquisition of auxiliary order information for entrusting to the on-line market server with auxiliary order documents (hereinafter, referred to as 'auxiliary order information'). The on-line market server may verify whether the buyer has subscribed to the on-line open market, instead of acquiring an identity card copy among the auxiliary order documents. This is possible because the buyer has already been authenticated for his/her real name when subscribing to the on-line open market.

The on-line market server may then request the vehicle registration office to provide a car registration certificate using member information and the auxiliary order information from the buyer, and acquire the car registration certificate.

In this manner, the on-line market server may acquire both the basic order information and the auxiliary order information, and order the Hi-pass terminal for the buyer to the seller, based on the basic order information and the auxiliary order information. Accordingly, the seller may set and enable the Hi-pass terminal so that the buyer can use the Hi-pass terminal, based on the basic order information and the auxiliary order information. The seller may deliver the set and enabled Hi-pass terminal to the buyer.

Figure 4:
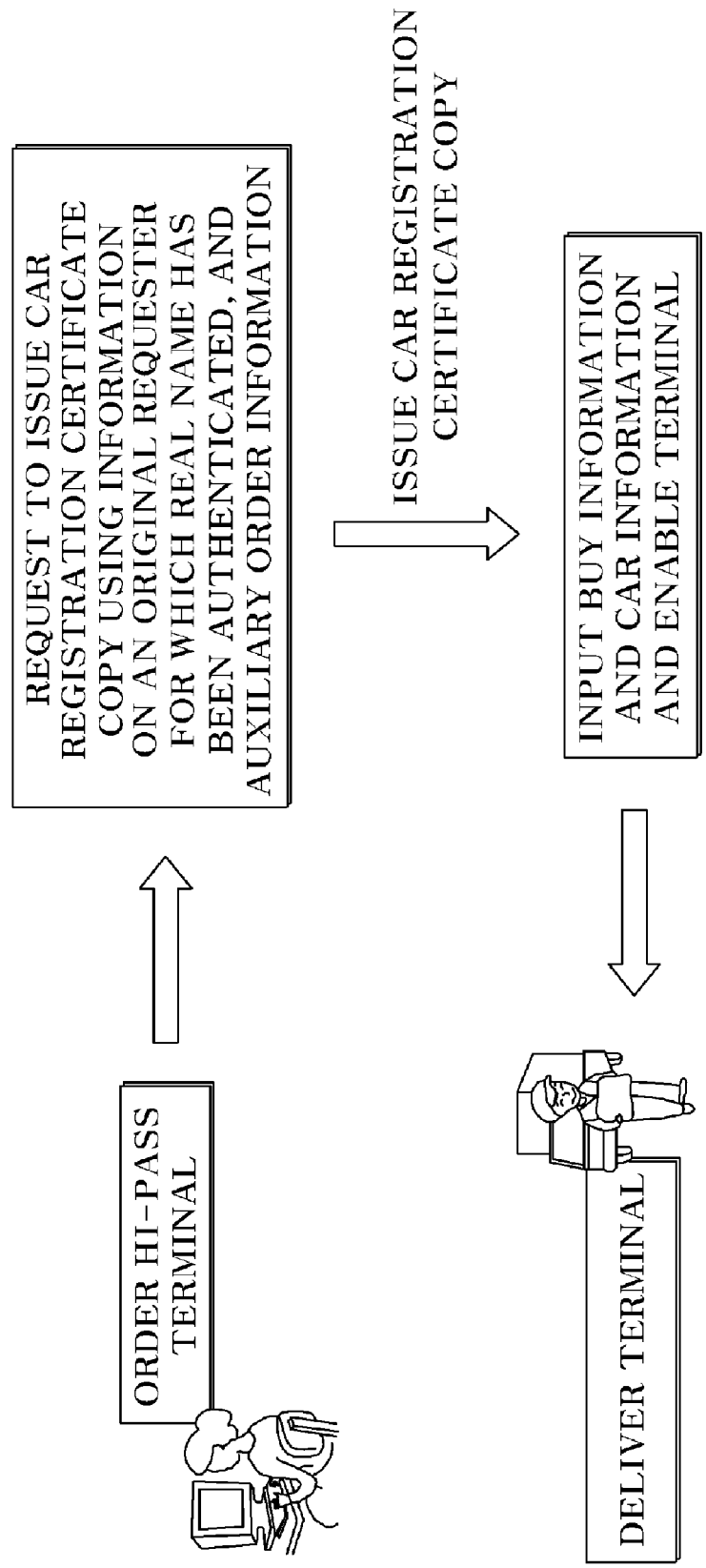
FIG. 4 illustrates a process of purchasing a Hi-pass terminal according to an exemplary embodiment of the present invention.

FIG. 4 illustrates a process of purchasing a Hi-pass terminal according to an exemplary embodiment of the present invention.

Referring to FIG. 4, when it is assumed that a buyer desiring to purchase a Hi-pass terminal orders the Hi-pass terminal on behalf of a real buyer, the buyer terminal may access the on-line market server managed by the on-line open market, input basic order information, and entrust the on-line market server with acquisition of auxiliary order documents for the real buyer. The on-line market server may receive the real buyer information and verify a real name of the real buyer based on the real buyer information, instead of acquiring an identity card copy among the auxiliary order documents. The on-line market server may then request the vehicle registration office to provide a car registration certificate using the real buyer information, and acquire the car registration certificate.

After acquiring both the basic order information and the auxiliary order information, the on-line market server may order a Hi-pass terminal for the real buyer to the seller, based on the basic order information and the auxiliary order information. Accordingly, the seller may set and enable the Hi-pass terminal so that the real buyer can use it, based on the basic order information and the auxiliary order information. The seller may deliver the set and enabled Hi-pass terminal to the buyer.

In this case, the on-line market server may write information on entrustment for acquisition of auxiliary order documents by the buyer, to a separate auxiliary order form, i.e. a power of attorney form. This will be described with reference to FIG. 5.

FIG. 5 illustrates an auxiliary order form according to an exemplary embodiment of the present invention.

Referring to FIG. 5, the buyer writes, on a power of attorney form, information on entrustment for acquisition of the auxiliary order documents, such as a relationship with a car owner, i.e., a buyer or a representative of a real buyer, and information on the buyer or the real buyer, such as a name and a residence registration number of a car owner, a car number, and a parking place. The input information may be utilized as information for verifying a real name of the buyer or the real buyer or acquiring a car registration certificate.

When the car owner is a buyer, the name and the residence registration number of the car owner may be automatically input based on the member information. This can eliminate a need for real name confirmation of the buyer to inactivate a real-name confirmation tag, for example.

Figure 6:
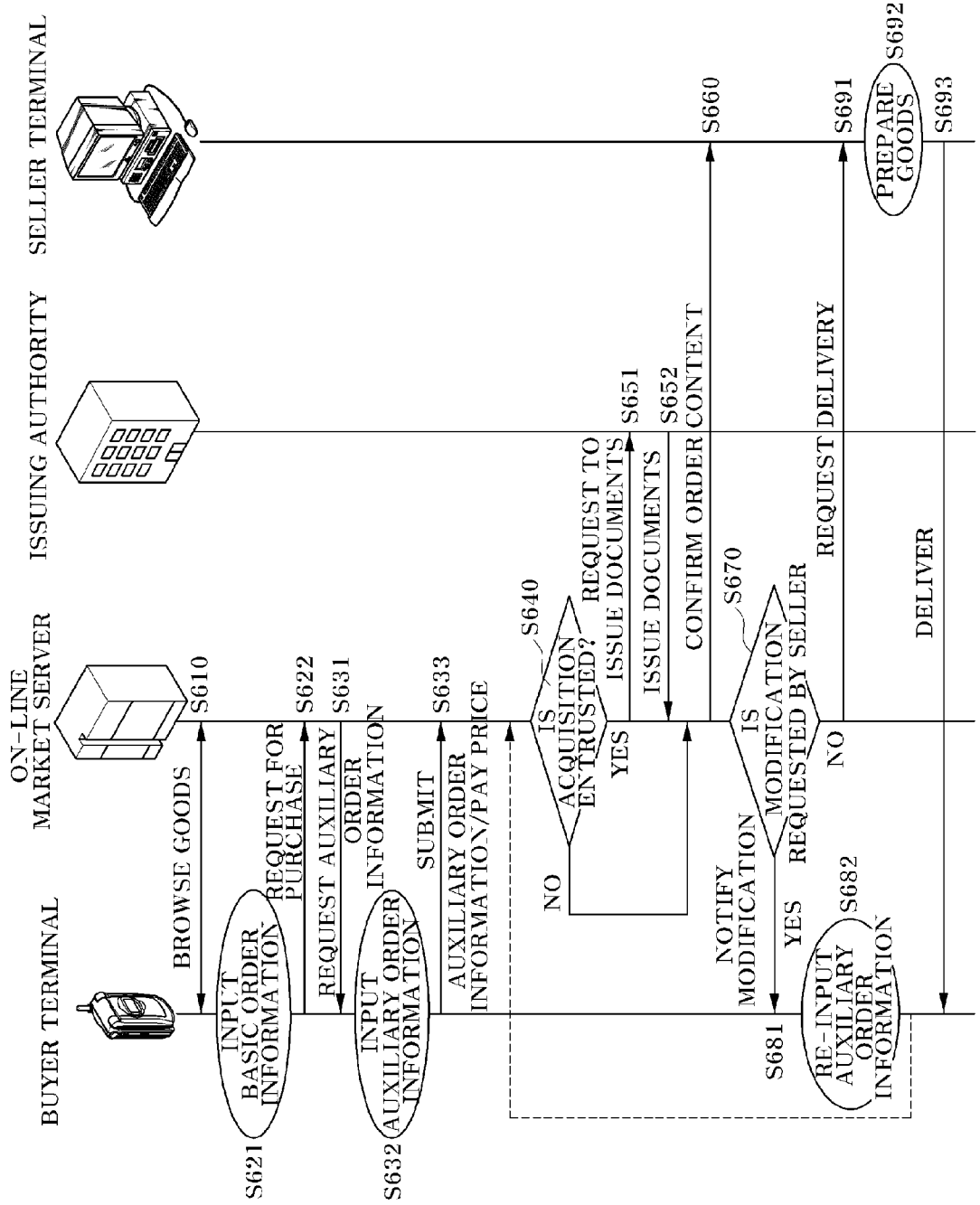
FIG. 6 illustrates an electronic commerce method according to an exemplary embodiment of the present invention.

FIG. 6 illustrates an electronic commerce method according to an exemplary embodiment of the present invention.

Referring to FIG. 6, the buyer terminal may access the on-line market server managed by the on-line open market and display a variety of Hi-pass terminals and related information registered in the on-line market server (S610). On the screen, the buyer may select a Hi-pass terminal that he/she desires to purchase and input basic order information, such as a model, a number, and a color of the Hi-pass terminal, a buyer's name, and a delivery region (S621) to request to purchase the Hi-pass terminal (S622).

In response to the request for purchase, the on-line market server requests the buyer terminal to provide auxiliary order information for the object for sale, i.e., the Hi-pass terminal (S631). In this case, the buyer may input information on entrustment by the buyer or the real buyer with acquisition of the auxiliary order documents, into an auxiliary order form, i.e., the power of attorney form on the screen (S632).

In this case, the on-line market server may differently set whether acquisition of the auxiliary order documents for the Hi-pass terminal is entrusted, depending on a credit class of the seller. In other words, when the credit class of the seller is below a pre-determined class, the buyer may directly prepare the identity copy of the buyer or the real buyer card and upload the identity copy as an attachment.

When the buyer submits the input auxiliary order information on the on-line market server (S633), the on-line market server may verify the entrustment for acquisition of the auxiliary order documents, such as an identity card copy and a car registration certificate copy, based on the auxiliary order information (S640). Thus, the on-line market server may verify the real name of the buyer subscribed as a member, instead of acquiring the identity card copy, and search for a uniform resource location (URL) of an issuing authority that issues a car registration certificate copy, such as a management server managed by a vehicle registration office. The on-line market server accesses the management server using the searched URL, requests to issue the car registration certificate of the buyer (S651), and acquires the issued car registration certificate (S652).

Of course, where the buyer desires to purchase in behalf of the real car owner, the on-line market server may verify the real name of the real car owner, i.e., the real buyer when the buyer is a member.

When the on-line market server acquires all the auxiliary order documents entrusted by the buyer, it ultimately displays the order content on the seller terminal, so that the seller can confirm the order content (S660). The seller then confirms the order content and verifies whether there is a portion to be modified in the order content and, particularly, the auxiliary order information, and notifies the portion, if any, to the on-line market server.

The on-line market server may verify the notification result to see whether the seller makes a request for modification (S670) and notify the buyer of the modification request from the seller (S681). Accordingly, the buyer may re-input the auxiliary order information for modification (S682).

On the other hand, when there is no request for modification from the seller, the on-line market server may request the seller terminal to deliver the buyer-purchased object for sale, i.e., the Hi-pass terminal (S691). As a result, the seller may confirm that fact on the seller terminal, prepare the Hi-pass terminal by setting the real buyer information in the Hi-pass terminal and enabling it (S692), and deliver the Hi-pass terminal to the buyer (S693).

The method and system functions according to the present invention may be implemented as computer-readable code stored on a computer-readable recording medium. The computer-readable recording medium includes any recording medium in which data that can be read by a computer system is stored. Examples of the computer-readable recording medium include a read-only memory (ROM), a random access memory (RAM), a compact disk-read only memory (CD-ROM), a magnetic tape, a floppy disk, an optical medium, etc. The recording medium includes a medium implemented in the form of a carrier wave (e.g., Internet transmission). The machine-readable recording medium may be distributed to networked machine systems, and codes may be stored in the recording medium to be read by a computer in a distributive manner, and executed on the recording medium.

The computer-readable medium may include program commands, data files, data structures or a combination thereof. Program instructions recorded on the medium may be particularly design and structured for the present invention or available to those skilled in computer software.

While exemplary embodiments of the present invention have been shown and described, it will be appreciated by those skilled in the art that various changes can be made to the described exemplary embodiments without departing from the spirit and scope of the invention defined by the claims and their equivalents.

The invention claimed is:

1. An electronic commerce system for brokering an on-line transaction between a seller and a buyer, the system comprising: an on-line market server for brokering the on-line transaction on the Internet, wherein the on-line market server, when entrusted with partial or full processing of acquisition of auxiliary order documents for an object for sale requested for purchase from the buyer, acquires the auxiliary order documents from an issuing authority and requests the seller to deliver the object for sale, based on the auxiliary order documents; and at least one database for storing information related to the buyer and the seller;
    wherein the on-line market server comprises: a transaction broker for brokering the on-line transaction on the Internet; an issuance processor for, when receiving auxiliary order information for entrusting partial or full processing of acquisition of the auxiliary order documents for an object for sale for which basic order information is input from the buyer that performs the on-line transaction, requesting the issuing authority to provide the auxiliary order documents and acquiring the auxiliary order documents; and a controller for requesting the seller to deliver the object for sale, based on the basic order information and the auxiliary order documents;
    wherein the on-line market server further comprises a real name verifier for verifying a real name of the buyer by verifying whether the buyer has subscribed to the on-line open market, instead of acquiring a specific auxiliary order document for verifying identity of the buyer when receiving the auxiliary order information for entrusting partial or full processing of acquisition of the auxiliary order documents for the object for sale for which basic order information is input from the buyer; and
    wherein when the buyer is a representative for a real buyer and the real name verifier receives the auxiliary order information for entrusting partial or full processing of acquisition of the auxiliary order documents from the representative, the real name verifier verifies the real name of the real buyer based on the auxiliary order information instead of acquiring a specific auxiliary order document for verifying identity of the buyer, and provides the verification result to the issuance processor.

2. The system of claim 1, wherein when the auxiliary order information for entrusting partial or full processing of acquisition of the auxiliary order documents for an object for sale for which basic order information is input from the buyer is received, the issuance processor requests the issuing authority to provide an auxiliary order document corresponding to a credit class of the seller that sells the object for sale and the issuance processor acquires the auxiliary order document.

3. The system of claim 1, wherein the issuing authority comprises an authority for issuing a predetermined certificate corresponding to the auxiliary order documents or a server managed by the authority.

4. The system of claim 1, wherein the auxiliary order documents comprise at least one of an identity card copy for verifying identity of the buyer and a car registration certificate copy for verifying whether the buyer owns a car.

5. An electronic commerce method for brokering an on-line transaction between a seller and a buyer, the method comprising: verifying, by an on-line market server, whether the on-line market server receives auxiliary order information for entrusting partial or full processing of acquisition of auxiliary order documents for an object for sale for which basic order information is input from the buyer; acquiring, by the on-line market server, the auxiliary order documents from an issuing authority depending on the verification result; and requesting, by the on-line market server, the seller to deliver the object for sale, based on the basic order information and the auxiliary order documents;
    wherein verifying comprises: when a request for purchase of the object for sale for which the basic order information is input is received from the buyer, requesting, by the on-line market server, the auxiliary order information for the object for sale; and determining, by the on-line market server, whether the auxiliary order information is received from the buyer;
    wherein acquiring comprises: when the on-line market server receives the auxiliary order information, searching for an issuing authority for issuing the auxiliary order documents; requesting, by the on-line market server, the issuing authority to issue the auxiliary order documents; and acquiring, by the on-line market server, the auxiliary order documents from the issuing authority;
    wherein acquiring further comprises: verifying, by the on-line market server, whether the buyer is a real buyer based on the auxiliary order information when receiving the auxiliary order information; and verifying, by the on-line market server, a real name of the buyer by verifying whether the buyer has subscribed to the on-line open market, instead of acquiring a specific auxiliary order document for buyer identity verification when the buyer is a real buyer; and
    wherein acquiring further comprises: verifying, by the on-line market server, whether the buyer is a real buyer or a representative for a real buyer based on the auxiliary order information when receiving the auxiliary order information; and verifying, by the on-line market server, a real name of the real buyer, instead of acquiring a specific auxiliary order document for buyer identity verification when the buyer is not a real buyer.

6. The method of claim 5, wherein acquiring comprises: acquiring, by the on-line market server, the auxiliary order document corresponding to a credit class of the seller from the issuing authority when receiving the auxiliary order information.

7. The method of claim 5, wherein requesting comprises: causing, by the on-line market server, the seller to confirm an order content, based on the basic order information and the auxiliary order documents for the object for sale; verifying, by the on-line market server, whether the seller confirming the order content requests to modify the order content; and requesting, by the on-line market server, the seller to deliver the object for sale when the seller does not request to modify the order content.

8. The method of claim 5, wherein the issuing authority comprises an authority for issuing a predetermined certificate corresponding to the auxiliary order document or a server managed by the authority.

9. The method of claim 5, wherein the auxiliary order document comprises at least one of an identity card copy for verifying the identity of the buyer and a car registration certificate copy for verifying whether the buyer owns a car.

* * * * *

UNITED STATES PATENT AND TRADEMARK OFFICE
CERTIFICATE OF CORRECTION

| | | |
|---|---|---|
| PATENT NO. | : 8,370,213 B2 | Page 1 of 1 |
| APPLICATION NO. | : 12/747350 | |
| DATED | : February 5, 2013 | |
| INVENTOR(S) | : Young Bae Ku | |

It is certified that error appears in the above-identified patent and that said Letters Patent is hereby corrected as shown below:

In the Specification

Column 5, line 11, delete "to." and insert --to--, therefor

Column 5, line 13, delete "goods," and insert --goods--, therefor

Column 6, line 44, delete "driver s" and insert --driver's--, therefor

Column 7, line 11, delete "driver s" and insert --driver's--, therefor

Column 10, line 11, delete "and" and insert --an--, therefor

Signed and Sealed this
Twenty-fifth Day of November, 2014

Michelle K. Lee
*Deputy Director of the United States Patent and Trademark Office*